US012723778B2

(12) United States Patent
Vorsteveld et al.

(10) Patent No.: US 12,723,778 B2
(45) Date of Patent: Sep. 1, 2026

(54) MACHINE LEARNING OF HEAT PUMP SYSTEM WATER USAGE PATTERNS FOR OPTIMIZED HEAT PUMP PERFORMANCE

(71) Applicant: Bradford White Corporation, Ambler, PA (US)

(72) Inventors: Lolke Vorsteveld, Derry, NH (US); Aaron Lord, Farmington, NH (US)

(73) Assignee: Bradford White Corporation, Ambler, PA (US)

( * ) Notice: Subject to any disclaimer, the term of this patent is extended or adjusted under 35 U.S.C. 154(b) by 87 days.

(21) Appl. No.: 18/657,432

(22) Filed: May 7, 2024

(65) Prior Publication Data

US 2025/0347444 A1 Nov. 13, 2025

(51) Int. Cl.

| | |
|---|---|
| ***F24H 15/172*** | (2022.01) |
| ***F24D 17/02*** | (2006.01) |
| ***F24D 19/10*** | (2006.01) |
| ***F24H 4/04*** | (2006.01) |
| ***F24H 15/152*** | (2022.01) |
| ***F24H 15/164*** | (2022.01) |

(Continued)

(52) U.S. Cl.

CPC ........... *F24H 15/164* (2022.01); *F24D 17/02* (2013.01); *F24D 19/1054* (2013.01); *F24H 4/04* (2013.01); *F24H 15/152* (2022.01); *F24H 15/172* (2022.01); *F24H 15/225* (2022.01); *F24H 15/375* (2022.01); *F24H 15/429* (2022.01); *G06N 20/00* (2019.01)

(58) Field of Classification Search

CPC ........ F24D 17/02; F24D 19/1054; F24F 5/00; F24F 5/0096; F24F 2221/183; F24H 15/152; F24H 15/164; F24H 15/172; F24H 15/225; F24H 15/254; F24H 15/375; F24H 15/429; G06N 20/00

See application file for complete search history.

(56) References Cited

U.S. PATENT DOCUMENTS

| | | |
|---|---|---|
| 5,660,328 A | 8/1997 | Momber |
| 6,560,409 B2 | 5/2003 | Troost, IV |

(Continued)

FOREIGN PATENT DOCUMENTS

| | | |
|---|---|---|
| AU | 2012201040 A1 | 9/2012 |
| DE | 102020215669 A1 | 6/2022 |

(Continued)

OTHER PUBLICATIONS

DE 102 57 431 (English translation) (Year: 2003).*

*Primary Examiner* — Jonathan Bradford
(74) *Attorney, Agent, or Firm* — Willard Quinn PLLC

(57) ABSTRACT

An air to water heat pump system is configured to minimize operating cost of the system utilizing one or more of hot water demand patterns, present or predicted ambient conditions, and/or electrical power cost. The system may be configured to reduce production and/or storage of hot water during periods of low demand, and increase production and storage of hot or hotter water immediately prior to a period of predicted high demand for hot water. The system may be configured to take into account ambient weather conditions to increase production and storage of hot water during favorable ambient conditions, and/or to increase production and storage of hot water prior to predicted cold ambient conditions.

15 Claims, 2 Drawing Sheets

(51) Int. Cl.

| | |
|---|---|
| ***F24H 15/225*** | (2022.01) |
| ***F24H 15/375*** | (2022.01) |
| ***F24H 15/429*** | (2022.01) |
| ***G06N 20/00*** | (2019.01) |

(56) References Cited

U.S. PATENT DOCUMENTS

| | | | |
|---|---|---|---|
| 6,962,162 | B2 | 11/2005 | Acker |
| 9,188,363 | B2 | 11/2015 | Buescher et al. |
| 9,390,381 | B2 | 7/2016 | Davari et al. |
| 10,088,852 | B2 | 10/2018 | Hazzard et al. |
| 10,274,226 | B2 | 4/2019 | Chaudhry et al. |
| 10,415,294 | B2 | 9/2019 | Yulkowski et al. |
| 2008/0104986 | A1 | 5/2008 | Gordon et al. |
| 2019/0285312 | A1 | 9/2019 | Goodjohn |
| 2020/0355387 | A1 | 11/2020 | Samuni et al. |
| 2022/0163221 | A1 | 5/2022 | Vega et al. |
| 2023/0127276 | A1 | 4/2023 | Carrasco et al. |
| 2024/0009025 | A1 | 1/2024 | Constant et al. |
| 2024/0019174 | A1 | 1/2024 | Hill et al. |
| 2024/0044522 | A1 | 2/2024 | Konowalczyk |

FOREIGN PATENT DOCUMENTS

| | | | |
|---|---|---|---|
| DE | 112021003710 | T5 | 4/2023 |
| EP | 3032181 | A1 | 6/2016 |
| JP | 2014194293 | A | 10/2014 |
| KR | 20100116288 | A | 11/2010 |

* cited by examiner

MACHINE LEARNING OF HEAT PUMP SYSTEM WATER USAGE PATTERNS FOR OPTIMIZED HEAT PUMP PERFORMANCE

BACKGROUND OF THE DISCLOSURE

Various air-to-water heat pump systems have been developed. Known heat pump systems may be utilized to heat water for use in buildings. Such buildings may comprise commercial or residential buildings. Heat pump systems may include hot water storage tanks that store hot water produced by the heat pump for use when the demand for hot water exceeds the capacity of the heat pump. Known air-to-water heat pump systems may utilize a control scheme whereby the heat pump is turned on if a temperature of stored hot water in a tank is at or below a first temperature, and the heat pump may be turned off if the temperature of the stored hot water is at or above a second temperature. Known air-to-water heat pump systems may, alternatively, utilize a preprogrammed schedule whereby the heat pump is turned on and off at specific times.

SUMMARY OF THE DISCLOSURE

An aspect of the present disclosure is a method of controlling an air-to-water heat pump system for a building having an evaporator that, in use, is exposed to ambient air from outside the building, and a tank system that stores a volume of hot water that has been heated by the heat pump. The method includes utilizing training data to train a machine learning program to generate a model that is capable of predicting periods of increased demand for hot water in a building. The method further includes utilizing the machine learning program to predict periods of low and high demand for hot water in the building. The method also includes utilizing the machine learning program to monitor a volume of hot water stored in the tank system, wherein the volume of stored hot water in the tank system is determined utilizing at least six water temperature sensors that are configured such that each water temperature sensor has a unique volume of stored hot water associated therewith, such that measured water temperatures from the at least six water temperature sensors can be utilized to measure the volume of hot water stored in the tank system to determine at least six non-equal volumes of stored hot water. The machine learning program predicts demand for hot water in the building based, at least in part, on data from the at least six water temperature sensors. The machine learning program is utilized to implement a load up cycle prior to a predicted period of high demand. The load up cycle includes: 1) reducing production of hot water by the heat pump to reduce the volume of hot water stored in the tank system, followed by: 2) increasing heat pump output to increase at least one of a temperature and a volume of hot water stored I the tank system prior to a predicted period of high demand for hot water in a building.

Training a machine learning program may include causing the machine learning program to track water temperature at each of the at least six water temperature sensors, and time stamping each significant change in water temperature, wherein significant changes in water temperature are determined according to predefined criteria.

The predefined criteria may comprise a change in water temperature of at least a predefined magnitude over a predefined time interval.

The predefined criteria may comprise a change in water temperature of at least 10° F. during a 12 hour period of time.

The at least six water temperature sensors may be arranged in a serial manner along a flow path of hot water through the tank system with a first sensor located adjacent to an inlet of the flow path that receives hot water from the heat pump, and a sixth sensor is located adjacent to an exit of the flow path, such that a volume of stored hot water associated with each sensor comprises a volume of water above a predefined temperature stored in the tank system between the sensor and the tank system inlet that receives hot water from the heat pump.

The system may be configured to time stamp and store each ON and OFF at which the heat pump is turned ON and OFF, respectively, and store heat pump run times for each ON and OFF time interval.

The system may be configured to store changes in water temperature measured by the at least six water temperature sensors, and store the volumes of stored hot water associated with the stored changes in water temperature.

The machine learning program may be configured to determine a thermal output of the heat pump during each run time based, at least in part, on ambient air temperature.

The machine learning may be configured to monitor ambient air temperature and adjust the volume of hot water stored in the tank system to reduce a cost of energy required to increase the volume of hot water stored in the tank system prior to a predicted period of high demand for hot water in a building.

The machine learning program may be configured to receive predicted ambient temperature data and adjust a temperature and/or a volume of hot water stored in the tank system to reduce a cost of energy required to increase the temperature and/or volume of hot water stored in the tank system during a load up cycle.

The heat pump may utilize electric power to produce hot water, and the machine learning program may be configured to receive data concerning cost of electrical power and adjust the volume of hot water stored in the tank system to reduce a cost of energy required to increase the volume of hot water stored in the tank system during a load up cycle.

The machine learning program may be configured to utilize ambient temperature data and the cost of electrical power to predict the cost of electrical power required to implement a load up cycle prior to a predicted period of high demand for hot water in a building, and the machine learning program may also be configured to minimize the predicted cost of electrical power based, at least in part, on the ambient temperature data and the cost of electrical power.

The method may include using a backup source of hot water to supply hot water if necessary to meet demand for hot water in a building.

The method may include configuring the system to operate in a baseline mode and cause the heat pump to produce hot water at a baseline temperature between at least some periods of high demand for hot water, followed by causing the heat pump to produce water at a temperature that is greater than the baseline temperature during a load up cycle.

The method may include configuring the system such that, in the baseline mode the system turns the heat pump ON and OFF when measured temperatures from a pair of temperature sensors drop to a first baseline set temperature and increase to a second baseline set temperature, respectively. The method may further include configuring the system to utilize first and second load up temperatures during a load up cycle, wherein the first and second load up temperatures are greater than the first and second baseline temperatures, respectively.

Another aspect of the present disclosure is a heat pump water heater system for heating water that is supplied to a hot water system of a building. The heat pump water heater system may include an air-to-water heat pump that heats water utilizing a heat exchanger that is exposed to ambient air. The system includes a hot water tank system that is configured to receive and store hot water that is produced by the heat pump. The system further includes at least six temperature sensors that are configured to measure water temperatures in the hot water tank system such that a volume of hot water in the hot water tank system at or above a measured temperature can be estimated to within 20% of an actual volume of hot water in the hot water tank system at or above the measured temperature. The system further includes a controller that is operably connected to the heat pump, the hot water tank system, and the at least six temperature sensors. The controller is configured to utilize machine learning to identify and predict patterns of hot water demand of the hot water system of a building, wherein at least one pattern includes a period of increased demand during which demand for hot water is greater than a period preceding the period of increased demand. The controller is also configured to adjust a volume and/or a temperature of hot water produced by the heat pump and/or stored in the hot water tank system based, at least in part, on a predicted period of increased demand to: 1) ensure that sufficient hot water is available to satisfy the demand for hot water during a predicted period of increased demand; and/or to: 2) reduce a cost of supplying hot water to satisfy the demand for hot water during a predicted period of increased demand; and/or: 3) increase efficiency during a period of increased demand.

The machine learning of the controller may utilize the cost of electrical power before and during a period of increased demand to control a temperature and/or a volume of hot water in the hot water tank system to minimize a cost of satisfying the demand for hot water during a predicted period of increased demand.

An efficiency of the heat pump may be a function of ambient air temperature, and the machine learning of the controller may utilize present and predicted ambient air temperature to control a temperature and/or a volume of hot water in the hot water tank system to minimize a cost of supplying hot water to a hot water system of a building.

The controller may be configured to implement a load up cycle prior to a predicted period of increased demand, wherein the load up cycle includes reducing a volume of hot water at a first temperature stored in the hot water tank system, followed by causing the heat pump to produce water at a second temperature that is greater than the first temperature, and wherein at least some of the water at the second temperature is directed into the hot water tank system prior to a predicted period of increased demand, and wherein the second temperature is at least 20° F. greater than the first temperature.

These and other features, advantages, and objects of the present disclosure will be further understood and appreciated by those skilled in the art by reference to the following specification, claims, and appended drawings.

Figure 1:
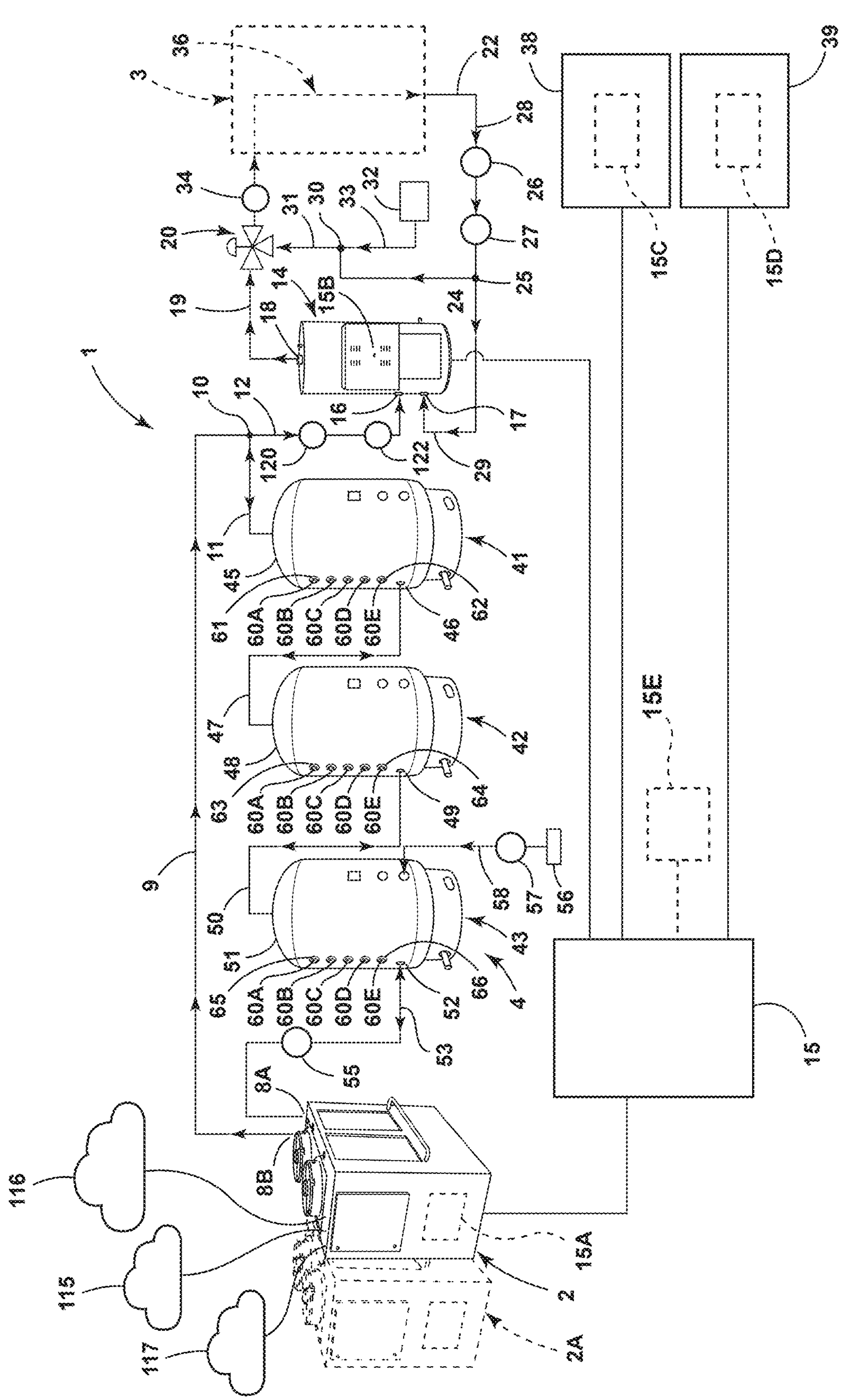
FIG. 1 is a schematic showing a heat pump water heater system according to an aspect of the present disclosure.

The components in the figures are not necessarily to scale, emphasis instead being placed upon illustrating the principles described herein.

DETAILED DESCRIPTION

The present application is related to U.S. patent application Ser. No. 18/657,352, entitled "AIR TO WATER HEAT PUMP SYSTEM HAVING OPTIMIZED OPERATION," filed on even date herewith, the entire contents of which are incorporated herein by reference.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein;

however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the terms "or" and "and/or," when used in a list of two or more items, means that any one of the listed items can be employed by itself or any combination of two or more of the listed items, can be employed. For example, if a composition or device is described as containing, including, or comprising components A, B, or C, the composition or device can contain (include) A alone; B alone; C alone; A and B in combination; A and C in combination; B and C in combination; or A, B, and C in combination. If a composition or device is described as containing, including, or comprising components A and/or B and/or C, the composition or device can contain (include) A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," "including" or any other variation thereof, are intended to cover a non-exclusive inclusion, such that a process, method, article, or apparatus that includes or comprises a list of elements does not include only those elements but may include other elements not expressly listed or inherent to such process, method, article, or apparatus. An element proceeded by "comprises . . . a" or "includes . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

With reference to FIG. 1, a heat pump water heater system 1 may include at least one air-to-water heat pump unit 2 that is configured to supply hot water to a water system 3 of a building or other such facility that requires hot water. System 1 may optionally include one or more additional heat pump units 2A that may be operably connected with the other components in substantially the same manner as heat pump unit 2. Unless explicitly stated otherwise, as used herein the term "heat pump unit" includes systems having a single heat pump unit 2 and systems having two or more heat pump units. As discussed in more detail below, the heat pump system 1 may also include a hot water tank system 4 (also referred to herein as "tank farm 4") that may be utilized to store hot water produced by the heat pump unit 2 and supply hot water to the hot water distribution system 3 (system 3 may also be referred to herein as Distributed Hot Water (DHW) system). The components of system 1 (e.g. heat pump unit 2 and/or hot water tank system 4) may be operably connected to a controller 15. As discussed below, controller 15 may comprise a control system including numerous components (e.g. controllers) that are operably interconnected, and the present disclosure is not limited to the single block 15 of FIG. 1. Also, system 1 may include two or more heat pump units 2, and the present disclosure is not limited to a system having a single heat pump unit 2.

Figure 2:
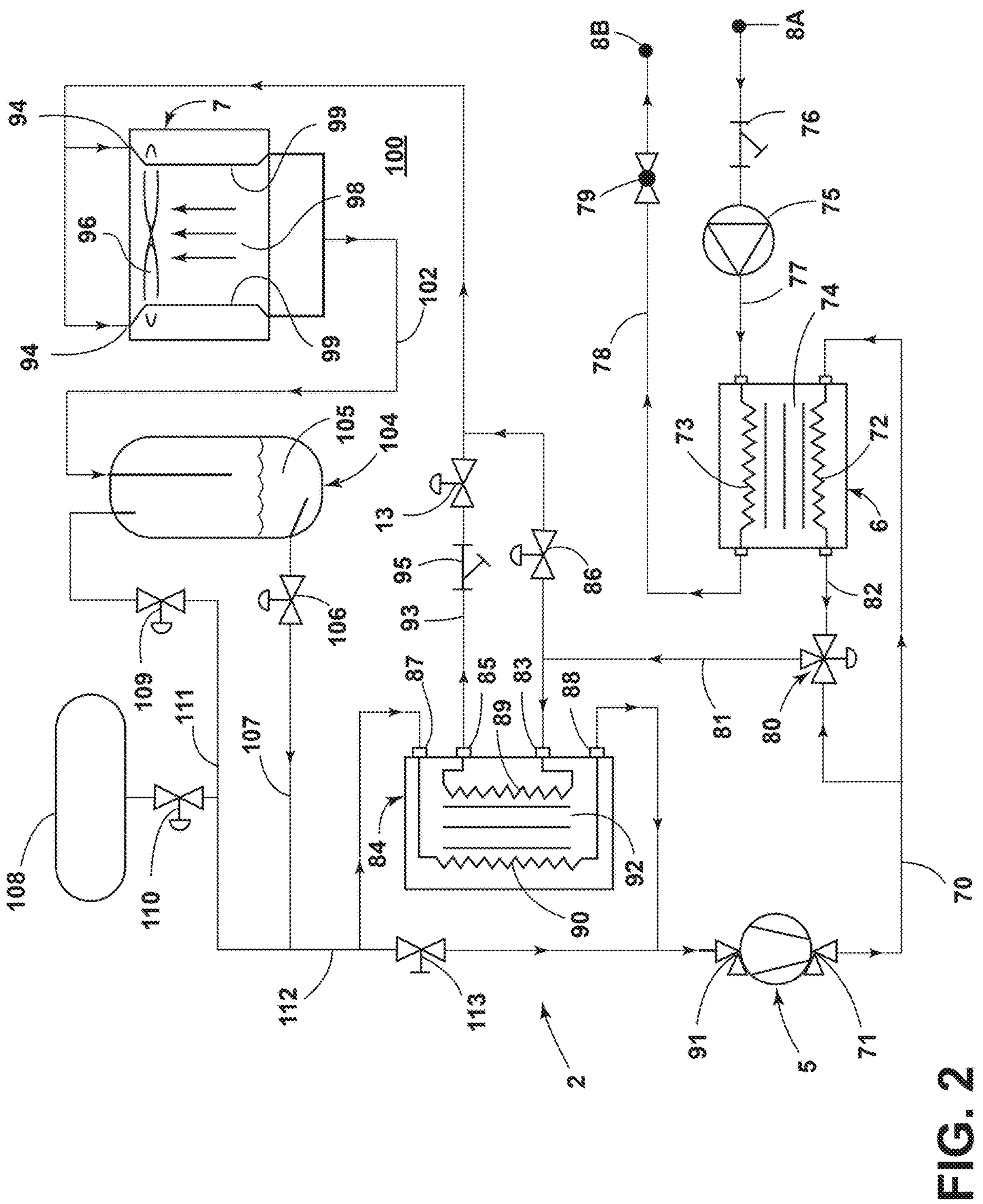
FIG. 2 is a schematic showing an air-to-water heat pump unit according to an aspect of the present disclosure.

With further reference to FIG. 2, heat pump unit 2 may include a compressor 5, a heat exchanger such as gas cooler/condenser 6, heat exchanger/evaporator 7, and an expansion valve 13 to heat cold water flowing into inlet 8A of heat pump unit 2 whereby hot water is discharged from outlet 8B of heat pump unit 2. The gas cooler/condenser 6 may comprise a gas cooler or it may comprise a condenser depending on the refrigerant used in heat pump unit 2. In a preferred embodiment, heat pump 2 utilizes $CO_2$ refrigerant, and component 6 comprises a gas cooler (i.e. heat exchanger for cooling $CO_2$ flowing through heat exchanger 6). However, other refrigerants may also be utilized and heat exchanger 6 may comprise a condenser. As used herein, the terms "cooler," "gas cooler," and "gas cooler/condenser" broadly refer to a heat exchanger that provides for heating of water and cooling of the refrigerant, which may or may not involve condensation of the refrigerant gas. It will be understood that the basic components and operation of heat pump unit 2 may be similar to known heat pump units utilized to heat water.

As discussed in more detail below, heat pump 2 converts electrical energy into thermal energy (hot water) that is stored in hot water tank system 4. Although the hot water tanks are insulated, some heat is lost from the stored hot water resulting in inefficiency. In general, heat pump 2 may need to be operated to generate hot water to replace hot water that has been drawn from tank system 4 to supply DHW system 3, and to replace water that has cooled during storage in hot water tank system 4 (standby losses). Although hot water usage may vary, the stored hot water volume may typically be used within a 4 to 6 hour period. Also, the efficiency of heat pump 2 will vary depending on ambient (outdoor) temperatures, and heat pump 2 is typically more efficient at higher ambient temperatures, and less efficient at lower ambient temperatures. Thus, if ambient temperatures vary over time, maximizing efficiency may involve operating heat pump 2 to generate hot water during warmer (more efficient) ambient conditions prior to a drop in ambient temperature, provided the standby losses do not exceed the efficiency gains resulting from generating hot water during favorable (warmer) ambient temperatures. The total cost of operating the system is a function of the amount and cost of electricity (or other power) at the time the electricity is used. Because the cost of electrical power may vary (e.g. it may increase at certain times of the day), minimizing the cost to operate the system 1 may involve increasing production (i.e. a larger portion of the tank system is at high temperature, or increased the stored water temperature to create a larger thermal buffer) of hot water during periods of lower electrical cost whereby the hot water is stored until the hot water is used during a period of increased electrical power cost. However, because some heat is lost from the stored hot water, the amount and timing of hot water production during periods of low energy cost may be adjusted (controlled) so that the heat losses (and resulting increased cost from operating heat pump 2) due to storing hot water do not exceed the reduction in cost from operating heat pump 2 during periods of reduced electrical power cost.

Also, as discussed below, the demand for hot water from system 1 may vary over time. Heat pump 2 may not be able to generate hot water at a sufficient rate to meet demand during periods of high demand (e.g. periods in which the DHW system 3 has a large load/high usage of hot water), and the system is therefore configured to operate heat pump 2 to generate and store hot water during periods of lower demand whereby the hot water stored in tank system 4 is used during periods of high demand. As discussed below, the demand for hot water and timing of the high demand periods may be at least somewhat predictable. In general, system 1 may be configured to ensure that sufficient hot water is stored in tank system 4 prior to periods of predicted high demand, while minimizing the cost (e.g. maximizing efficiency) necessary to meet the demand. In operation, the volume of hot water stored in tank system 4 may typically be nearly depleted 3 to 5 times a day, an advanced load-up period will recharge the tank system 4 and reheats the water stored in tank system 4. As used herein, "hot water" generally refers to water having a temperature that is greater than a predefined temperature (e.g. 140° F., 160° F., 180° F., etc.) whereby the hot water is suitable for use by DHW system 3. Water supplied to DHW system 3 is typically at least 120° F.-125° F. Thus, "hot water" stored in tank system 4 is typically at least 120° F.-125° F. In general, producing and storing water at, for example, 160° F. or 180° F. provides increased thermal capacity relative to producing and storing water at a lower temperature (e.g. 140° F.). However, heat pump 2 is somewhat less efficient at higher water temperatures, and higher temperatures also result in increased standby losses. "Cold water" may generally refer to water having a temperature that is less than the predefined hot water temperature. For example, if DHW System 3 required 120° F. water, water in tank system 4 that is below 120° F. may be considered cold water.

As discussed below, if the temperature of the stored hot water is above 120° F., then hot water from tank system 4 is typically mixed with cold water whereby water at 120° F. is supplied to DHW system 3. Thus, the volume and/or temperature of hot water stored in the tank system 4 may be increased to provide an increase in stored thermal energy as required to meet expected increases in demand. The timing and amount of thermal energy stored in tank system 4 may also be adjusted to provide increased efficiency and/or reduced cost, even if increased storage of hot water (thermal energy) is not required to meet predicted increases in demand.

Referring again to FIG. 2, an exit 71 of compressor 5 is fluidly connected to a line 70 whereby, during operation, hot gas (refrigerant) flows through line 70 to gas cooler/condenser 6 during operation. Hot gas flows through gas lines 72 and heat is transferred through a thermally conductive structure 74 to water lines 73 whereby water flowing through water line 73 is heated. Heat pump unit 2 may include a water pump 75 and a valve 76 to control flow of water through water line 77 from cold water inlet 8A. After the water is heated by heat exchanger 6, the water flows through line 78 to outlet 8B. Heat pump unit 2 may include a valve 79 to control flow of water through line 78 to outlet 8B and the speed of pump 75 may also be controlled.

During operation, hot refrigerant (e.g. $CO_2$) flows from heat exchanger 6 through line 82, through a three-way defrost valve 80, and into a inlet 83 of a recuperator/super heater 84. As discussed in more detail below, three-way defrost valve 80 and defrost valve 86 may be utilized to provide a defrost cycle. In use, hot refrigerant from line 81 flows into inlet 83 of recuperator 84, and cold gas (refrigerant) (e.g. $CO_2$ or other suitable substance) from evaporator 7 flows into inlet 85 of recuperator 84. The hot gas or liquid from heat exchanger 6 flows through internal line 89 of recuperator 84, and cold gas (refrigerant) from evaporator 7 flows through internal line 90 whereby heat is transferred from line 89 to line 90 through a thermally conductive structure 92 to partially heat cold gas (refrigerant) from evaporator 7 before the gas (refrigerant) enters inlet 91 of compressor 5. Hot or warm refrigerant exiting outlet 85 of recuperator 84 flows through a line 93 to one or more inlets 94 of evaporator 7. A valve 95 may be utilized to control the flow of refrigerant through line 93, and expansion valve 13 causes the pressure and temperature of the refrigerant in line 93 to drop in a manner that is generally known in the art.

Evaporator 7 may be positioned inside of a building or in an ambient (outdoor) space 100 outside of a building. One or more fans 96 may be actuated to promote flow of ambient air 98 over lines 99 of evaporator 7, resulting in cold gas (refrigerant) flowing through line 102 after the gas exits the evaporator 7. If evaporator 7 is located inside of a building, air 98 may be routed from outside the building to evaporator 7 through ducts (not shown) whereby air 98 is typically at an ambient temperature. A liquid separator 104 may be utilized to separate liquid 105 (e.g. liquid refrigerant or oil) from the gas, and an oil recovery valve 106 and oil line 107 may be utilized to recover the oil or other liquid. Flow of cold gas through line 111 may be controlled by a valve 109, and a valve 110 may be utilized to control flow of gas between line 111 and an expansion tank 108. The cold gas flows through line 112 to inlet 91 of compressor 5. The gas flowing through line 112 may be controlled by a valve 113. In general, if valve 113 is closed, cold gas in line 112 is routed into recuperator 84 whereby the gas is heated before flowing into the inlet 91 of compressor 5. During a defrost cycle defrost valves 80 and 86 may be actuated, and valve 95 may be closed such that hot gas exiting compressor 5 flows through evaporator 7, bypassing heat exchanger 6 and recuperator 84. It will be understood that defrost cycles are typically as short as possible to reduce energy loss caused by the defrost cycle. The compressor 5, pump 75, fans 96 of evaporator 7, valves, and other components of heat pump unit 2 may be operably connected to controller 15.

In a typical application, the components of heat pump 2 may be positioned inside a building, with ducting from the outdoors delivering ambient air 98 to and from the evaporator 7. Also, it will be understood that the present disclosure is not limited to the specific heat pump shown in FIG. 2. In general, virtually any heat pump including a compressor, gas cooler/condenser, and evaporator may be utilized in a heat pump system 1 (FIG. 1) according to the present disclosure.

In general, the speed of compressor 5 may be increased to increase a volume of water (e.g. GPM) produced by heat pump 2 at a selected temperature and/or to increase a temperature of hot water produced by heat pump 2. If necessary, the speed of compressor 5 may also be increased to compensate for reduced ambient temperatures.

Referring again to FIG. 1, a hot water outlet 8B of heat pump unit 2 may be fluidly connected to a water line 9 whereby hot water flows through a water line 9 to a junction 10. The hot water may flow from junction 10 through a water line 11 to the hot water tank system 4, and hot water may also flow from junction 10 through hot water line 12 to a "swing tank" which may comprise a conventional electric (or gas) water heater 14. Junction 10 may comprise a valve that is operably connected to a controller 15 whereby the water flow from line 9 to lines 11 and 12 can be controlled during operation of the heat pump system 1. For example, as discussed in more detail below, the controller 15 may be configured to direct hot water from heat pump unit 2 through line 11 to hot water tank system 4 if the demand for hot water from the water system 3 is presently low (but expected to increase), the controller 15 may be configured to cause hot water to flow from junction 10 through line 12 to inlet 16 of electric water heater 14 if demand for hot water from the water system 3 is high. The electric water heater 14 may be actuated to heat water if the water flowing through water line 12 is not sufficiently heated, whereby hot water from outlet 18 of electric water heater 14 flows through water line 19 to a mixing valve 20. It will be understood that electric water heater 14 ("swing tank") is optional, and it is not required according to other aspects of the present disclosure.

As discussed above, controller 15 may comprise a control system including one or more components that are operably interconnected, and it does not necessarily comprise a single control unit. For example, heat pump unit 2 may include a controller 15A, water heater 14 may include a controller 15B, back up heat sources 38 and 39 (discussed below) may include controllers 15C and 15D, respectively and the system may include a controller 15E that controls tank system 4. Thus, the term "controller" is not limited to a specific configuration, but rather may comprise virtually any suitable arrangement of hardware and/or software that is capable of controlling the heat pump system 1 in the manner described herein.

Water system 3 may optionally include a hot water return 22 whereby unused hot water from the water system 3 flows through a water line 28 to a junction 25, and the water may then flow through a line 24 to a junction 30 through a water line 31 to mixing valve 20. The water from hot water return 22 may also flow from junction 25 through water line 29 to an inlet 17 of electric water heater 14. The temperature and flow rate of water in water line 28 may be measured by temperature sensor 26 and flow sensor 27, respectively. Temperature sensor 26 and flow sensor 27 may be operably connected to the controller 15. Junction 25 may comprise a valve to control the flow of water from hot water return 22 to the inlet 17 of electric water heater 14 and to mixing valve 20. The system 1 may also be fluidly connected to a cold water supply 32 whereby cold water flows through water line 33 to junction 30 and to mixing valve 20. Cold water supply 32 may comprise a component of the water system 3, or it may comprise a separate component. It will be understood that the cold water supply 32 is optional.

During operation, controller 15 may utilize a water temperature measured by a temperature sensor 34 to mix hot water flowing into mixing valve 20 through water line 19 and water flowing into mixing valve 20 through water line 31. The water flowing through line 31 may comprise a mixture of water from cold water supply 32 and hot water return 22. Electric water heater 14 may include a temperature sensor whereby the temperature of water flowing through water line 19 into mixing valve 20 may be supplied to controller 15. Similarly, cold water supply 32 may include a temperature sensor whereby the temperature of water flowing through water line 33 can be supplied to the controller 15. Furthermore, temperature sensor 26 is operably connected to controller 15 whereby the temperature of the water flowing through hot water return 22 is also provided to controller 15. Controller 15 may be configured to utilize the measured temperatures of the water flowing into mixing valve 20 and out of mixing valve 20 to thereby provide a desired water temperature (e.g. as measured by temperature sensor 34) supplied to the system loop 36 of water system 3. The water from mixing valve 20 then flows to the system loop 36 of water system 3. The water supplied to system 3 from valve 20 may be 120° F. or other suitable temperature.

The system may optionally include one or more backup heat sources 38 and 39. The backup heat sources 38 and 39 are operably connected with the controller 15. Backup heat sources 38 and/or 39 may be fluidly connected to one or more of the water lines to provide additional heating capacity if required. For example, the backup heat sources 38 and/or 39 may comprise "on demand" (tankless) gas or electric resistance heaters that are configured to heat water flowing through one or more of water lines 9, 12, or 19 to provide additional hot water if demand from water system 3 exceeds the capacity of heat pump unit 2 and hot water availability from hot water tank system 4. It will be understood that the backup heat sources 38 and 39 are optional, and the heat pump system 1 does not necessarily need to include one or both backup heat sources 38 and 39.

Referring again to FIG. 1, hot water tank system 4 may (optionally) include first second and third stratified hot water tanks 41, 42, and 43, respectively. However, hot water tank system 4 may include a single tank, two tanks, or it may include four or more hot water tanks. Hot water from water line 11 may flow into a top 45 of first tank 41 when hot water from heat pump unit 2 is flowing into the hot water tank system for storage. Alternatively, hot water may flow from top 45 of first tank 41 through line 11 to water system 3 if hot water is being drawn from the hot water tank system 4. Water in line 11 can flow in either direction, depending on the flow in line 12 and flow in line 11. In general, water only flows in line 11 when the heat pump 2 is running. If flow in line 12 is greater than the flow in line 11, additional hot water is being drawn from the tanks 41-43. In this case, cold water enters tank 43 via line 58 and the total volume of hot water in tanks 41-43 is being reduced. If the flow line 12 is less than the flow line 11, heated water is being put into tanks 41-43. In this case, cold water enters tank 43 via line 58, and the pump pulls cold water from tank 43, and the total hot water volume in tanks 41-43 is being increased.

A bottom outlet 46 of first tank 41 is fluidly connected to a top 48 of the second tank 42 by a water line 47, and a bottom outlet 49 of second tank 42 is fluidly connected to a top 51 of third tank 43 by a water line 50. A bottom outlet 52 of third tank 43 may be fluidly connected to inlet 8A of heat pump unit 2, and a flow sensor 55 may measure a flow volume of water through the line 53. Heat pump system 1 may optionally include a cold makeup water supply 56 that is fluidly connected to a second bottom opening 52A of tank 51 to supply additional cold water to third tank 43 if required. A flow sensor 57 may be operably connected to a controller 15 whereby a controller 15 can control the flow of cold water from cold makeup source 56. It will be understood that the flow sensor 57 may further comprise a valve, or cold makeup source 56 may include a valve, whereby the valves can be controlled by the controller 15 to control flow of cold water from cold makeup source 56. The tanks 41, 42, and 43 may be insulated to reduce the loss of heat from water stored in the tanks 41-43. Nevertheless, during operation the hot water stored in tanks 41-43 will normally be at least somewhat stratified such that the water near the top of each tank 41-43 is at a higher temperature than the water at the bottom of each tank 41-43. Depending on the operating conditions, the temperature difference between the water of the tops and bottoms of the tanks 41-43 may be slight (e.g. 1-5° F.) or it may be greater (e.g. 10-20° F. or more). Also, because hot water from water line 11 initially enters first tank 41, the water in first tank 41 is typically at a higher temperature than water in second tank 42, and water in second tank 42 is typically warmer than water stored in third tank 43.

As discussed in more detail below, the system (e.g. controller 15) may be configured to cause heat pump unit 2 to generate hot water that is stored in the tanks 41-43 during periods of lower hot water demand, whereby hot water stored in the tanks 41-43 can be supplied through water line 11 to the water system 3 during periods of higher demand. Hot water in excess of current demand may also be generated and stored in tank system 4 during periods when the hot water can be generated more efficiently and/or at a lower cost, and the stored hot water can be drawn from tank system 4 and used during periods in which producing hot water would be less efficient and/or more costly.

Each tank 41-43 may include a plurality of threaded connections 60A-60E that are located at vertically spaced-apart locations on each tank 41-43. The threaded connections 60A-60E are configured to receive thermal wells for mounting temperature sensors. In general, temperature sensors may be positioned in one or more of the threaded connectors 60A-60E as required for a particular application. For example, each tank 41-43 may include a temperature sensor positioned adjacent a top of the tank (e.g. one of connectors 60A and 60B) to measure a temperature of water in the top of the tank, and another temperature sensor that is located adjacent a bottom of the tank utilizing, for example, one of the lower threaded connectors 60D or 60E, to measure a temperature of water in a bottom of the tank. The temperature sensors are operably connected to the controller 15. Because the water stored in tanks 41-43 is stratified, the upper temperature sensors will tend to have a higher temperature reading than the lower temperature sensors for each tank.

In a system according to an aspect of the present disclosure, a first water temperature sensor 61 is located adjacent a top portion 45 of first tank 41 to measure a temperature of water in the top portion 45 of first tank 41, and a second water temperature sensor 62 is located adjacent a bottom portion 46 of first tank 41 to measure a temperature of water in the bottom portion of first tank 41. A third water temperature sensor 63 is located adjacent an upper portion 48 of second water tank 42, and a fourth water temperature sensor 64 is located adjacent a lower portion 49 of second tank 42. A fifth water temperature sensor 65 is located adjacent upper portion 51 of tank 43, and a sixth water temperature sensor 66 is located adjacent a lower portion 52 of third tank 43. Thus, the sensors 61-66 are configured to measure the temperature of water in the top and bottom portions of each tank 41-43. It will be understood that FIG. 1 is schematic in nature, and the locations of the water temperature sensors 61-66 may be selected as required for a particular application.

In general, the positions of the water temperature sensors 61-66 may be selected to provide the controller 15 with sufficient information to estimate the volume of hot water stored in the hot water tank system 4 within about 15%-20% of the actual hot water volume at any time. In general, because hot water from heat pump 2 enters the top of tank 41, the water temperature of sensor 61 will be the highest, and sensor 66 will have the lowest temperature reading. Thus, the temperatures measured by sensors 61-66 will generally decrease between each sensor 61-66 whereby a volume of water having a temperature above a selected temperature can be determined. For example, if the temperatures of sensors 61-63 are at or above 140° F., and the temperatures of sensor 64-60 are below 140° F., the volume of water above 140° F. is the volume of water "above" sensor 63.

The system may be configured to determine that water above a predefined temperature is "hot water." The predefined temperature may vary depending on the requirements and operating conditions of a particular installation. In general, the predefined temperature may be 140° F., 160° F., 170° F., 180° F., or other suitable temperature. As discussed below, the system 1 may (for example) be configured to produce (via heat pump 2) and store water at a first temperature (e.g. 140° F.) during certain operating conditions, and produce and store hot water at a second temperature (e.g. 160° F., 180° F., etc.) if necessary to meet predicted demand and/or if producing and storing hot water at a higher temperature results in greater efficiency and/or reduced cost.

Hot water exiting tanks 41-43 may be mixed with cold water whereby water entering system 3 has a lower temperature (e.g. 120° F. or 125° F.). It will be understood that the number of water temperature sensors and locations of the water temperature sensors may be selected to provide even greater accuracy (e.g. estimated hot water storage volume within 10%, 5%, or less of the actual volume of hot water stored in hot water tank system 4). Also, all of the sensors 61-66 may be located on a single hot water tank if tank system 4 includes a single tank. For example, tank 41 could be the only tank in hot water tank system 4, and tank 41 could include six sensors in six mounting locations (e.g. locations 60A-60E and an additional location). In this example, tank 41 could, optionally, have increased capacity to provide the same total volume as the three tanks 41-43 of FIG. 1. System 1 may also include additional tanks and/or additional sensors. For example, one or more of tanks 41-43 could each include three temperature sensors mounted at locations 60A, 60C, 60E to provide additional accuracy concerning the temperature of hot water in hot water tank system 4.

Referring again to FIG. 1, the system 1 (e.g. controller 15 and/or other components) may be operably connected to a building data system 115 whereby data from the building system may be communicated to the heat pump system 1. The heat pump system 1 may also be operably connected to a CTA-2045 system 116 whereby electrical power rates, power demand, and other data from an electric utility may be communicated to the heat pump system 1. The system 1 may also be interconnected to a worldwide network 117 (i.e. the "internet"). Accordingly, the system 1 may receive data concerning the operation of the building system, local electrical power rates, and current and predicted weather conditions.

The system 1 (e.g. controller 15) may be configured to monitor water demand of water system 3 over time to determine patterns. For example, if the building comprises an apartment building or other multi-unit building, hot water demand may tend to be high during certain times of the day (e.g. 6-8 a.m.) on weekdays, and may be somewhat lower during other portions of the day. The water demand on other days (e.g. weekends and holidays) may have a different pattern. In general, the usage patterns may be determined by the controller 15. The usage patterns may also be manually entered into the system 1 based on observed patterns. The system may be configured to minimize operating expense by varying the volume of hot water stored in the hot water tank system 4 utilizing water temperatures from temperature sensors 61-66.

In general, the system 1 may be configured to provide increased efficiency and/or reduce operating cost based on hot water demand patterns and preferential ambient conditions for operation of the heat pump unit 2. For example, system 1 may be configured to utilize an advanced load-up (increase in volume and/or temperature of stored hot water) to reduce electrical costs. In order to maximize the cost benefit of advanced load-up, the volume of hot water stored in hot water tank system 4 may be reduced prior to the increase in stored hot water. If a daily demand pattern is known, the system can be configured to first reduce the volume of hot water in the hot water tank system 4 to a low volume directly prior to an advanced load-up cycle, whereby the hot water produced during the load-up cycle is used (shed) during the period of high demand following the advanced load-up.

In addition, the thermal output of heat pump unit 2 is dependent on the outdoor temperature. Accordingly, the system can be configured to reduce the volume of hot water being stored when the outdoor temperature is greater to reduce standby heat losses from hot water tank system 4. Conversely, the system may be configured to increase the volume of stored hot water in hot water tank system 4 at lower outdoor temperatures to offset the reduced heat pump capacity to thereby ensure that sufficient hot water can be supplied during the predicted high demand. If the system determines that the cost to heat the water during a specific cold ambient condition exceeds the cost to heat the water using, for example, electrical heater 14 and/or backup heat sources 38 and 39, the system may utilize hot water from heater 14 or other sources rather than heat pump unit 2

The system 1 may be configured to reduce a volume of hot water stored in hot water tank system 4 prior to a predicted high demand period. This may be accomplished by reducing hot water output of the heat pump unit 2 for a period of time such that the volume of hot water drawn from tank system 4 exceeds the volume of hot water supplied by heat pump 2. Following the draw down of hot water, the system may then increase production of hot water by heat pump 2 to increase the volume of hot water in the tank system 4 immediately prior to the predicted demand increase. During the period of increased demand, the hot water is drawn (shed) from the tanks 4 at a faster rate than the hot water is supplied by the heat pump 2. In general, creating hot water immediately prior to use of the hot water during the period of high demand reduces the length of time that the hot water is stored in the tank system 4. This, in turn, reduces "standby" heat loss from the tank system 4 compared to an operating scheme in which the volume of hot water in tank system 4 is maintained at a relatively constant (high) level.

Furthermore, as noted above, the system may be configured to utilize predicted ambient conditions (temperature) to adjust the volume of hot water stored in tank system 4. This may be utilized in conjunction with adjustments in the hot water volume based on predicted hot water demand. For example, the system 1 may be configured to provide an advanced load up cycle based on known or predicted periods of increased and/or decreased demand, and the volume of hot water stored in the tank system 4 may be further adjusted (controlled) based on current and/or predicted ambient temperatures. System 1 may be configured to provide a "normal" or baseline operating mode in which water at outlet 8B of heat pump 2 is, for example, 140° F. During a "load up" mode of operation water at outlet 8B may be, for example, 160° F.-170° F., and system 1 may also be configured to provide an "advanced load-up" mode in which water at outlet 8B is, for example, 180° F. It will be understood that the terms "load up" and "advanced load-up" may be used interchangeably herein to refer to operation that provides increased storage of thermal energy utilizing an increased volume and/or temperature of hot water in tank system 4. A load up cycle may be utilized to reduce cost and/or increase efficiency and/or to ensure that sufficient hot water will be available to satisfy a predicted period of increased demand for hot water.

Thus, if the ambient temperature is relatively high the heat pump unit 2 will be able to generate hot water at a higher rate whereby a volume of hot water stored in the tank system 4 can be reduced during an advanced load up cycle. Conversely, if the current and/or ambient temperatures are predicted to be relatively low, a higher volume of hot water may be stored in the tank system 4 during the advanced load up cycle to compensate for the reduced ability of the heat pump unit 2 to generate hot water during cold ambient conditions. Also, because the heat pump unit 2 can more efficiently produce hot water during warmer ambient conditions, system 1 may be configured to generate and store more hot water during warm ambient conditions if ambient conditions are predicted to change to colder temperatures. This enables the system to generate and store hot water during favorable ambient conditions, followed by draw down (use) of the hot water during colder ambient conditions when it would be less efficient to produce hot water.

In general, the system 1 may be initially configured (e.g. programmed) to have a baseline operating scheme or program. The baseline scheme may comprise, for example, maintaining a constant high volume of hot water (e.g. 140° F.) that does not, at least initially, take into account demand patterns, ambient weather conditions, and electrical cost. In this example, the system may be programmed to monitor for demand patterns and adjust the volume and/or temperature of hot water stored in the system when demand patterns are recognized. This monitoring and adjustment may be based on a conventional algorithm or a machine learning program. The system may also be configured to modify the initial control scheme based on existing and/or predicted ambient conditions. This modification may be based on a control algorithm and/or machine learning in connection with modifications to the control based on demand patterns. Still further, the system may be configured to take into account electrical rates and further adjust the control (i.e. timing and volume of hot water stored) to minimize the cost required to meet the daily hot water demands. Thus, for example, if electrical rates are significantly reduced during certain periods of time, the system may be configured to produce and store additional hot water during periods of low electrical cost even if the overall efficiency of the system is somewhat reduced, provided the loss of heat from the stored hot water and reduced efficiency do not exceed the cost reductions due to reduced power costs.

It will be understood that the system 1 may be initially configured (e.g. during installation) to include variations in production and storage of hot water based on known demand patterns and/or known weather patterns. For example, if it is known that a particular building experiences reduced demand between midnight and 6 a.m., followed by increased demand between 6 a.m. and 9 a.m., the system may be initially configured to reduce production and storage of hot water after midnight, followed by advanced load-up (increased production and storage of hot water) prior to the increased demand at 6 a.m. Also, if the system is installed in a climate that is known to be relatively warm for a period of time during, for example, summer months, and relatively cold during, for example, winter months, the system may be initially configured to produce and store less hot water during the summer months, and produce and store more hot water during load up or advanced load-up during the winter months. Still further, if it is known that electrical rates are lower during certain periods of time, the system may be initially configured to produce and store more hot water during periods of low electrical power cost. These initial operating parameters may be adjusted by a user or operator if it is apparent that the initial operating schedule is less than optimum (e.g. the initial expected demand patterns no longer match current demand patterns). Alternatively, the system may be configured to identify pattens of increased demand and automatically modify the initial control scheme based on recognition of demand patterns and/or current and predicted ambient conditions. The system may also be configured to adjust the timing and volume of hot water produced and stored in order to minimize expected expense (e.g. based on electrical power usage and electrical power rates).

In general, the electrical power cost required to operate the system 1 is a function of the cost of electricity at the time the electricity is used, and the amount of electrical power used. The amount of electrical power used is, in turn, a function of the system's efficiency. As discussed above, efficiency may be increased by reducing the average volume of hot water that is stored in the tank system 4. In general, if the volume of hot water in tank system 4 were to be maintained at a maximum possible amount at all times, a significant portion of the hot water would cool over time without being used, and additional hot water would need to be produced to compensate, leading to reduced efficiency and increased cost. Thus, as noted above, demand patterns may be utilized to produce hot water immediately prior to expected periods of increased demand to thereby reduce energy losses that would otherwise be incurred if maximum hot water storage volume were to be maintained.

Also, as noted above, the efficiency of the heat pump unit 2 is a function of ambient temperature conditions, and the system may be configured to increase production and storage of hot water during ambient conditions providing higher efficiency if predicted demand and predicted ambient conditions suggest that the hot water produced during favorable ambient conditions can be utilized before the hot water cools in tank system 4, and wherein the use is predicted to occur during ambient conditions when the heat pump unit 2 is less efficient (e.g. cold or ambient conditions).

As also noted above, the system may be configured to take into account variations in the cost of electrical power to increase production of hot water during periods of reduced electrical cost, and decrease production of hot water during periods of relatively high electrical power costs. The system may be configured to take into account these variables to operate the system 1 in a manner that reduces the expected overall cost. System 1 may be configured based on a predefined control scheme, or the system may utilize machine learning to recognize patterns and reduce overall cost.

If the system (e.g. controller 15) is configured to utilize machine learning, the system may be configured to continuously monitor tank temperatures (e.g. using water temperature sensors 61-66), turn on (and off) heat pump unit 2 as required, and anticipate higher demand patterns based on historic performance/data. A flow meter 120 (FIG. 1) and temperature sensor 122 may be integrated in water line section 12 to measure the temperature and volume of hot water flowing into the electric water heater 14 (FIG. 1). Water flow and temperature data may be recorded and internally tabulated (e.g. by controller 15) on a suitable (e.g. hourly) basis to develop daily usage patterns. The machine learning program may also compensate for outdoor temperature effects by increasing or decreasing the volume and/or the water temperature of hot water stored in tank system 4 as it accounts for heat pump output capacity changes and accounts for time periods of lower electrical costs.

Heat pump output performance may have a linear dependence on outdoor temperature (Toutdoor) below 50° F. and desired (set) water outlet temperature (Toutlet) of the heat pump 2 and can be expressed as:

$$Q(HP)Toutlet = A * Toutdoor + B \tag{1}$$

Where:

Toutlet is the set point temperature (target temperature) of the outlet water temperature of heat pump 2 and Toutdoor is the actual temperature (e.g. measured) of air supplied to the heat pump 2.

Q(HT) Toutlet is the thermal energy output of the heat pump 2 as a function of outdoor temp (Toutdoor) for Toutdoor<50° F.

Factor A sets the slope of the heat output curve based on desired or target (set) outlet temperature and factor B(Tinlet) describes the effect of different inlet water temperature (e.g. water temperature at heat pump inlet 8A, FIG. 1) for a certain heat pump outlet temperature. Table 1 shows a typical value set for factors A and B:

TABLE 1

| Toutlet | A | B(40) | B(50) | B(60) | B(70) | B(80) |
|---|---|---|---|---|---|---|
| 180° F. | 375 | 140,000 | 130,000 | 125,000 | 120,000 | 115,000 |
| 160° F. | 360 | 145,000 | 142,000 | 140,000 | 138,000 | 135,000 |
| 140° F. | 320 | 160,000 | 155,000 | 150,000 | 145,000 | 140,000 |

The hot water output in gallons per minute (GPM) of a heat pump (HP) can be described as:

$$GPM(HP) = \text{function}(Toutdoor, Toutlet, Tinlet) = Q(HP)/[500 * (Toutlet - Tinlet)] \tag{2}$$

During machine learning, the system (e.g. controller 15) tracks water temperature at each sensor, Si (e.g. sensors 61-66) (and its respective hot water volume associated with each sensor, Vi) and time stamps each major (significant) temperature change at any sensor. The water volume associated with each sensor may comprise the volume of water above the first sensor, and between adjacent sensors. Thus, V1 may (for example) comprise the volume of water above the first temperature sensor. For example, with reference to FIG. 1, V1 may comprise the volume of water in tank 41 above sensor 61 and V2 may comprise V1 plus the volume of water in tank 41 between sensors 61 and 62. In general, V6 may comprise close to the entire volume of water in tank system 4 (e.g. 90%, 95%, or 99% of the entire volume of water in tank system 4).

During set up of controller 15, the total volume of stored hot water may be entered, and the location of each sensor as a percentage of (part of the stored volume of hot water at that sensor) divided by the total volume of tank system 4. The system may utilize predefined water temperature change criteria (e.g. a change of 5° F., 10° F., 20° F., 30° F., 40° F., 50° F., etc.) to determine if a major (significant) change in water temperature (increase and/or decrease) has occurred during a predefined time interval. The predefined time interval may be selected for a particular application. In general, the predefined time interval may comprise, for example, 30 minutes (or less), 1 hour, 1-12 hours, or longer. It will be understood that other predefined criteria (e.g. a % change in water temperature) may also be utilized. The occurrence of a major (significant) increase in temperature at a given sensor over a specific time interval indicates that more hot water is entering the tank system 4 than leaving tank system 4. Likewise, a major (significant) decrease in temperature at a given sensor means that the hot water is being drawn from the tank system 4 at a higher rate than hot water is entering tank system 4.

A difference in time stamps between two adjacent sensors (e.g. sensors 61 and 62, or sensors 62 and 63) denotes an increase in stored hot water volume if sensor i+1 shows a significant increase in temperature compared to the time stamp when sensor i experienced a similar increase in temperature.

For example, if tanks 41 and 42 are at 140° F. and tank 43 is at 60° F., the controller 15 may cause the heat pump 2 to provide an advanced load-up and generate 180° F. water (e.g. increase the temperature of water produced by heat pump 2 from 140° F. to 180° F.). The temperature measured by S1 in tank 41 at 9 a.m. may (in this example) change from 140° F. to 180° F. In this example, at 9:30 a.m., the temperature measured by S2 of tank 41 may change from 140° F. to 180° F. This means that the volume of hot (180° F.) water in tank system 4 increased (V2-V1=the increase in volume of water at 180° F.). Since the flow meter (120) measures water flow into the DHW usage of the building, in this example the thermal battery (tank system 4) gained additional thermal energy due to the advanced load-up. In case of hot water depletion from the tank system 4, a reduction in thermal energy stored by the tank system 4 would be seen (i.e. based on the temperatures measured by sensors 51-56).

By keeping track of stored hot water volume (and temperature) and usage over time, the system can be made to control itself utilizing controller 15 and develop "learned behavior" (e.g. utilizing machine learning).

In general, if temperature sensor i+1 shows a significant increase in water temperature at a first time stamp, and an upstream sensor i shows a similar significant increase in water temperature at an earlier second time stamp that is before the first time stamp, this indicates that there has been an increase in the volume of stored hot water.

V1 is stored hot water volume at sensor S1 (e.g. hot water volume in tank 41 above sensor 61) with time stamp TS1. V2 is stored hot water volume at sensor S2 (e.g. hot water volume in tank 41 between sensors 61 and 62) with time stamp TS2.

M (HP) is the gallons per minute (GPM) of hot water produced by the heat pump 2. See equation (2) above.

Runtime (HP) is the runtime in minutes for the heat pump.

M Draw is the measured hot water flow into the inlet 17 of a swing tank such as electric water heater 14 coming from the stratified tank system 4 and heat pump 2 (if running) into the swing tank. Through time sampling of flow rates a gal/hour rating can be determined.

The stratified tank system 4 and its total water volume (V0) is preferably monitored at 6 (or more) locations utilizing at least six temperature sensors (e.g. sensors 61-66). In general, each sensor location represents a certain percentage of tank volume. Sensor S1 (e.g. sensor 61) is located near the heat pump outlet 8B, S6 (e.g. sensor 66) represents the sensor near the heat pump inlet 8A. If S6 is hot (e.g. a temperature at or above a predefined temperature) (e.g. 140° F., 160° F., 180° F., etc.), this indicates that substantially (e.g. 95%) of V0 (the volume of entire tank system) is charged (i.e. at or above a predefined "hot" water temperature. V1 might, for example, represent a 15% of V0 (total water volume in tank system 4), V2 may be 30% of V0, V3 may be 45% of V0, V4 may be 65% of V0, V5 may be 75% of V0, and V6 may be 95% V0.

The program may maintain the following records:

1) Time stamps of each ON and OFF operation (i.e. the times at which heat pump 2 is turned on and off with an ON or OFF indicator) and run time (HP1, HP2, etc.) for each heat pump (e.g. store the length of time between each ON and OFF).
2) Track changes in water temperature at the S1-S6 temperature sensors (e.g. sensors 61-66, FIG. 1) as they equate to (correspond to) stored hot water volumes (V1-V6).
3) Based on outdoor (ambient) temperature and water inlet and outlet temperatures, the thermal output of each heat pump during each runtime session can be determined. (See equation 1 above).
4) Based on time stamps (TS1-TS6) for significant temperature changes occurring at S1-S6 and run times of HP1, HP2, it is possible to determine an average Mdraw between adjacent time stamps and compare this to the actual integrated value determined by time sampling of flow rates as discussed above.
5) Each time a new time stamp occurs, the tank system 4 provides an update to the controller 15 regarding the (effective) volume of stored hot water. The values (measured temperatures) of sensors S1 through S6 provide additional thermal information.

Through time stamped tracking of major temperature changes at the tank sensors S1-S6 (e.g. sensors 61-66, respectively) on a daily basis, it is possible to accurately determine run-time patterns of heat pump 2, and the machine learning program can develop optimized heat pump run time and adjust the run time to meet hot water requirements for actual use patterns. The machine learning program may optimize heat pump run times to minimize operating expense, taking into account the time of day electrical rates, reduced tank storage requirements (e.g. due to reduced demand or warmer ambient temperatures permitting greater heat pump output). The system (machine learning program) may operate in a "reduced" energy mode during hotter weather conditions whereby the heat pump can be adjusted to operate at lower compressor speeds and lower axial fan speeds to optimize heat pump efficiency, and the program can also prepare in advance for pending emergency preparation via incorporation of the weather data and other data inputs.

In general, the machine learning program can be trained utilizing historical data from one or more hot water heat pump systems whereby the machine learning model recognizes demand patterns in a new installation and optimizes operation of the system to minimize cost based on predicted demand patterns. The system may be configured to provide advanced load up prior to a predicted period of increased demand only if the probability of increased demand is sufficiently high.

The following examples (scenarios) are for a system having two stratified tanks with temperature sensors in each tank of tank system 4. The examples may be implemented utilizing an algorithm and/or machine learning. The examples may also be implemented by manually programming controller 15 if demand patterns, electrical rates, and ambient conditions are known. In the following examples, sensors S1-S6 generally correspond to sensors 61-60 of FIG. 1. However, the following examples involve a tank system 4 with two tanks, wherein sensors S1-S3 are installed in a first tank, and sensors S4-S6 are installed in the second tank.

Scenario #1: For a large 6-9 a.m. DHW load: Run heat pump 2 prior to 6 a.m. to charge tank system 4. Charging may include causing heat pump 2 to produce hot water at a rate (e.g. GPM) that exceeds use of hot water.

Summer operation: Charge the tank system 4 to sensor S4 with (advanced) load-up to take advantage of the lower electrical rates and reduced storage tank requirements (i.e. charge tank system 4 until sensor S4 reaches a predefined "hot" water temperature (e.g. 140° F.)), then (optionally) turn the heat pump off. The heat pump 2 may be turned back on when S3 drops to a predefined temperature during the large draw (e.g. between 6-9 a.m.).

Winter operation: Charge the tank system 4 to sensor S6 with water at a "normal" temperature (e.g. 140° F.) (e.g. turn off heat pump 2 when sensor S6 reaches 140° F. to provide an additional volume of stored hot water (relative to charging to S4) partially offset lower heat output from heat pump 2 in colder weather conditions. Turn on the heat pump 2 once S5 drops in temperature to supply large morning drawn.

Scenario #2: Refined operation relative to Scenario #1.

Summer operation: Same as Scenario #1 above, but run the compressor 5 and fans 96 in energy saving mode (e.g. <80% of normal operation) once outdoor temperature exceeds a predefined temperature (80° F.) to increase the coefficient of performance (COP) and reduce the energy required to meet predicted demand.

Winter operation: Same as Scenario #1 above, but to offset extreme low outer (ambient) temperatures, the compressor speed may be increased (e.g. 15 to 20% above normal operation) to increase heat pump output (increase heat output of heat pump).

Scenario #3: Adjust operation in scenarios #1 and/or #2 to account for favorable (lower) and/or unfavorable (higher) electrical rates during operation (e.g. increase the volume and/or temperature of hot water produced by heat pump 2 during lower a.m. electrical rates).

Summer+winter operation: Fine tune time window of tank heating based on time of day pricing for electricity (e.g. increase production of thermal energy (hot water) when electrical rates are reduced).

Scenario #4 Mid morning idling: Shut down heat pump:

Summer operation: Shut down heat pump 2 until tank system 4 is drawn down to S2 (i.e. turn off heat pump 2 until sensor S2 drops to a predefined temperature), then turn on heat pump 2 until a selected sensor reaches a predefined (minimum) temperature. This provides a large buffer of cold water for another (advanced) load up period.

Winter operation: Shut down heat pump 2 to draw down tank system to S4 (or larger) (i.e. turn off heat pump 2 until sensor S4 drops to a predefined temperature). Turn on heat pump 2 when S4 reaches a predefined (minimum) temperature, and turn off heat pump 2 when a selected sensor "above" S4 reaches the predefined (minimum) temperature. This provides a smaller buffer of cold water for another (advanced) load up period (Shed period).

Scenario #5: Prepare for a large draw (demand) at (for example) 5-9 p.m. Re-heat tank system 4 from, for example, 10 a.m.-4 p.m. Repeat scenario #1 and/or #2 and/or #3 (or combination thereof).

If system 1 is configured to utilize machine learning, the machine learning program can determine the time window of operation to properly charge the system (e.g. tank system 4) with increased thermal energy (increased water volume and/or temperature) based on, for example, daily demand patterns (as recorded by in-line flow meter 120) and adjust water outdoor temp, favorable electrical rates while (optionally) storing some extra hot water in tank system 4 above a predicted necessary volume of hot water in case the actual use of hot water exceeds a predicted amount.

It is to be understood that variations and modifications can be made on the aforementioned structure without departing from the concepts of the present disclosure, and further it is to be understood that such concepts are intended to be covered by the following claims unless these claims by their language expressly state otherwise. For example, a system 1 may include a single hot water tank, two hot water tanks, or three hot water tanks. The system may also include four or more hot water tanks if required for a particular application.

What is claimed is:

1. A method of controlling an air-to-water heat pump system for a building having an evaporator that, in use, is exposed to ambient air from outside the building, and a tank system that stores a volume of hot water that has been heated by the heat pump, the method comprising:

utilizing training data to train a machine learning program to generate a model that is capable of predicting periods of increased demand for hot water in a building;

utilizing the machine learning program to predict a period of low demand for hot water, predict a period of high demand for hot water that has a greater demand for hot water than the period of low demand for hot water, and monitor a volume of hot water stored in the tank system, wherein the volume of stored hot water in the tank system is determined utilizing at least six water temperature sensors that are configured such that each water temperature sensor has a unique volume of stored hot water associated therewith such that measured water temperatures from the at least six water temperature sensors can be utilized to measure the volume of hot water stored in the tank system to determine at least six non-equal volumes of stored hot water;

wherein the machine learning program predicts demand for hot water in the building based, at least in part, on data from the at least six water temperature sensors;

utilizing the machine learning program to implement a load up cycle prior to a predicted period of high demand, the load up cycle including:

1) reducing production of hot water by the heat pump to reduce the volume of hot water stored in the tank system; followed by:

2) increasing heat pump output to increase at least one of a temperature and a volume of hot water stored in the tank system prior to a predicted period of high demand for hot water in a building.

2. The method of claim 1, wherein:

training the machine learning program includes causing the machine learning program to track water temperature at each of the at least six water temperature sensors, and time stamp each significant change in water temperature, wherein significant changes in water temperature are determined according to predefined criteria.

3. The method of claim 2, wherein:

the predefined criteria comprises a change in water temperature of at least a predefined magnitude over a predefined time interval.

4. The method of claim 3, wherein:

the predefined criteria comprises a change in water temperature of at least 10° F. during a 12 hour period of time.

5. The method of claim 2, wherein:
the at least six water temperature sensors are arranged in a serial manner along a flow path of hot water through the tank system with a first sensor located adjacent to an inlet of the flow path that receives hot water from the heat pump, and a sixth sensor located adjacent to an exit of the flow path, such that a volume of stored hot water associated with each sensor comprises a volume of water above a predefined temperature stored in the tank system between the sensor and the tank system inlet that receives hot water from the heat pump.

6. The method of claim 5, wherein:
the system is configured to time stamp and store each ON and OFF at which the heat pump is turned on and off, respectively, and store heat pump run times for each ON and OFF time interval.

7. The method of claim 6, wherein:
the system is configured to store changes in water temperature measured by the at least six water temperature sensors and store the volumes of stored hot water associated with the stored changes in water temperature.

8. The method of claim 7, wherein:
the machine learning program is configured to determine a thermal output of the heat pump during each run time based, at least in part, on ambient air temperature.

9. The method of claim 1, wherein:
the machine learning program is configured to monitor ambient air temperature and adjust the volume of hot water stored in the tank system to reduce a cost of energy required to increase the volume of hot water stored in the tank system prior to a predicted demand for hot water in a building.

10. The method of claim 9, wherein:
the machine learning program is configured to receive predicted ambient temperature data and adjust a temperature and/or a volume of hot water stored in the tank system to reduce a cost of energy required to increase the temperature and/or volume of hot water stored in the tank system during a load up cycle.

11. The method of claim 10, wherein:
the heat pump utilizes electric power to produce hot water;
the machine learning program is configured to receive data concerning cost of electrical power and adjust the volume of hot water stored in the tank system to reduce a cost of energy required to increase the volume of hot water stored in the tank system during a load up cycle.

12. The method of claim 11, wherein:
the machine learning program is configured to utilize ambient temperature data and the cost of electrical power to predict the cost of electrical power required to implement a load up cycle prior to a predicted period of high demand for hot water in a building;
the machine learning program is configured to minimize the predicted cost of electrical power based, at least in part, on the ambient temperature data and the cost of electrical power.

13. The method of claim 12, including:
using a backup source of hot water to supply hot water if necessary to meet demand for hot water in a building.

14. The method of claim 1, including:
configuring the system to operate in a baseline mode and cause the heat pump to produce hot water at a baseline temperature between at least some periods of high demand for hot water, followed by causing the heat pump to produce water at a temperature that is greater than the baseline temperature during a load up cycle.

15. The method of claim 14, including:
configuring the system such that, in the baseline mode the system turns the heat pump ON and OFF when measured temperatures from a pair of temperature sensors drop to a first baseline set temperature and increase to a second baseline set temperature, respectively;
configuring the system to utilize first and second load up temperatures during a load up cycle, wherein the first and second load up temperatures are greater than the first and second baseline temperatures, respectively.

* * * * *